(12) United States Patent
Helton

(10) Patent No.: US 8,782,975 B2
(45) Date of Patent: Jul. 22, 2014

(54) FLOOD PROOF DOOR

(76) Inventor: Ronald M. Helton, Conroe, TX (US)

( * ) Notice: Subject to any disclaimer, the term of this patent is extended or adjusted under 35 U.S.C. 154(b) by 0 days.

(21) Appl. No.: 13/455,573

(22) Filed: Apr. 25, 2012

(65) Prior Publication Data

US 2012/0204503 A1 Aug. 16, 2012

Related U.S. Application Data

(62) Division of application No. 12/427,069, filed on Apr. 21, 2009, now Pat. No. 8,166,719.

(51) Int. Cl.
*E06B 1/04* (2006.01)
*E06B 7/16* (2006.01)
*E06B 7/098* (2006.01)

(52) U.S. Cl.
USPC ........... 52/204.1; 52/213; 49/483.1; 49/475.1

(58) Field of Classification Search
CPC ....... E06B 1/62; E06B 9/00; E06B 2009/007; E06B 7/16; E06B 1/34; E06B 1/52; E06B 5/003
USPC .............. 52/204.1, 58, 60–62, 213; 49/475.1, 49/476.1, 483.1, 484.1
See application file for complete search history.

(56) References Cited

U.S. PATENT DOCUMENTS

| | | | | |
|---|---|---|---|---|
| 3,164,869 A * | 1/1965 | Barkan | ......................... | 49/479.1 |
| 3,371,445 A * | 3/1968 | Herr et al. | ........................ | 49/368 |
| 3,796,010 A * | 3/1974 | Carlson | ........................ | 49/477.1 |
| 3,861,081 A * | 1/1975 | Maskell | ............................ | 49/70 |
| 5,687,518 A * | 11/1997 | Endo et al. | .................... | 52/204.1 |
| 6,557,309 B1* | 5/2003 | Johnson | .......................... | 52/210 |
| 6,725,610 B2* | 4/2004 | Murphy et al. | .................... | 52/58 |
| 6,931,802 B2* | 8/2005 | Jones et al. | ..................... | 52/202 |
| 8,375,478 B2* | 2/2013 | Luo | ................................. | 4/556 |
| 2002/0148178 A1* | 10/2002 | Farag | ........................ | 52/204.1 |
| 2004/0194426 A1* | 10/2004 | Shapero | ....................... | 52/749.1 |
| 2006/0064937 A1* | 3/2006 | Danczek et al. | ............. | 49/475.1 |
| 2006/0101736 A1* | 5/2006 | Okugawa | ..................... | 52/204.1 |
| 2010/0325974 A1* | 12/2010 | Shapero | ..................... | 52/169.14 |

FOREIGN PATENT DOCUMENTS

| | | | |
|---|---|---|---|
| CH | 679604 A5 * | 3/1992 | |
| DE | 4008813 A1 * | 9/1991 | |
| DE | 4242180 A1 * | 6/1994 | |
| DE | 102007041688 A1 * | 10/2009 | |
| DE | GB002481616 A * | 1/2012 | |
| EP | 1516991 A2 * | 3/2005 | |
| GB | 2148990 A * | 6/1985 | |
| GB | 2245297 A * | 1/1992 | |

(Continued)

OTHER PUBLICATIONS

Machine Translation of JP 2008031710 A, Hara, Satoru, p. 1-9.*

(Continued)

*Primary Examiner* — Elizabeth A Plummer
(74) *Attorney, Agent, or Firm* — John J. Love; Claude Cooke, Jr.; Cook Law Firm

(57) ABSTRACT

A flood proof door assembly includes a door supported by hinges in a door jamb frame. A door flange frame is attached to the periphery of the door and includes a gasket that presses on the door jamb frame when the door is closed thereby forming a seal.

1 Claim, 10 Drawing Sheets

(56) References Cited

FOREIGN PATENT DOCUMENTS

| | | | | |
|---|---|---|---|---|
| GB | 2278142 | A | * | 11/1994 |
| GB | 2367847 | A | * | 4/2002 |
| JP | 2008031710 | A | * | 2/2008 |

OTHER PUBLICATIONS

Machine translation of DE 4008813 A1, date pulled Feb. 23, 2013, p. 1-9.*

* cited by examiner

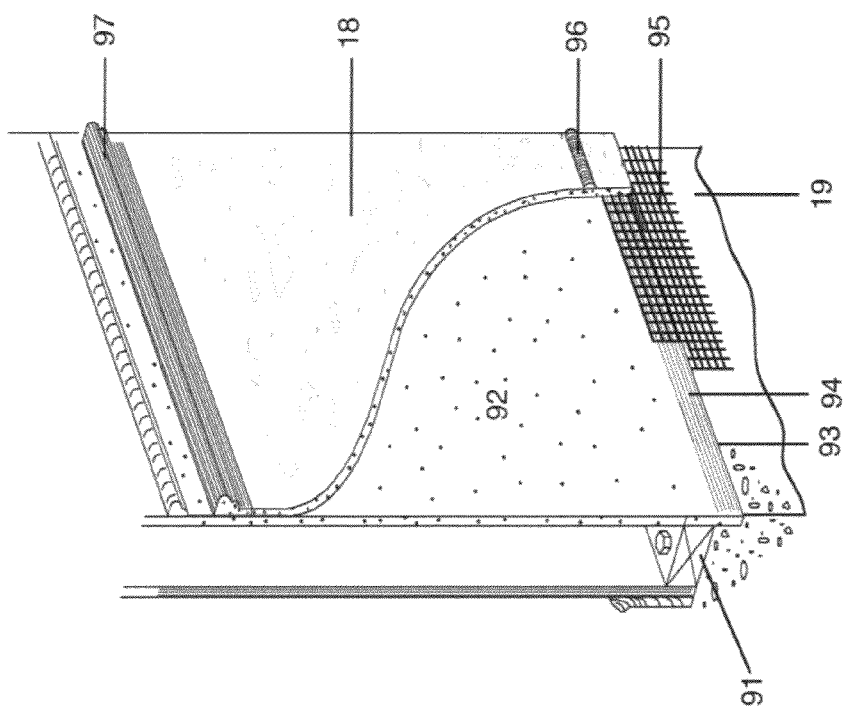

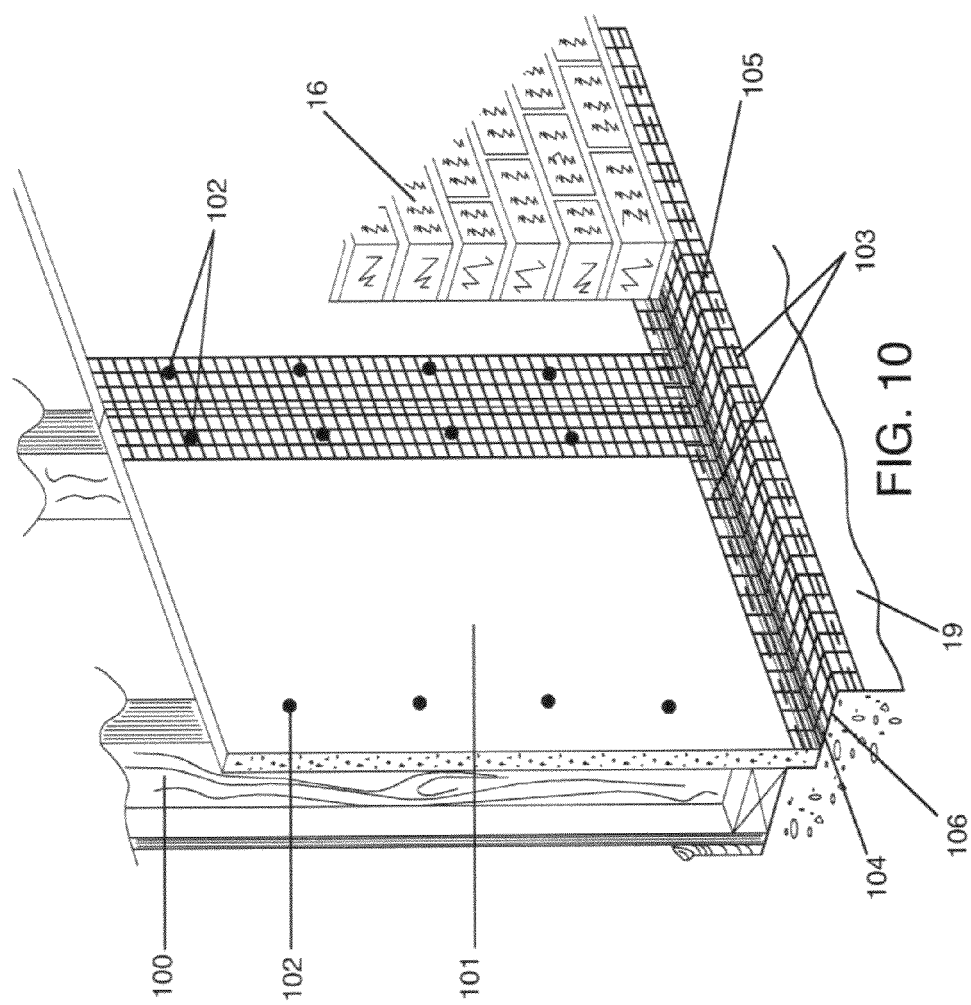

FLOOD PROOF DOOR

This application is a divisional of application Ser. No. 12/427,069 filed on Apr. 21, 2009.

BACKGROUND OF INVENTION

1. Field of the Invention

This invention relates to protecting wood frame and light gauge steel frame buildings from damage by flood water intrusion into the interior of the building. More particularly, method and materials for preventing water from passing through walls, windows and window openings and doors and door openings of buildings are provided.

2. Description of Related Art

According to the Federal Emergency Management Administration of the U.S. government (FEMA) and the National Flood Insurance Program (NFIP), flash flooding is the most common natural disaster in the U.S. One-third of flood loss claims paid are in "low-risk" areas, and the average flood loss claim payment is $42,000.

For many years, flood protection methods have been developed and used in protection of commercial, institutional and high-rise multi-family residential buildings. Temporary flood barriers and gates have been developed as an improvement to sand bags to keep rising surface water out of buildings, but there is a need for a "passive" method and corresponding materials for flood proofing wood frame and light-gauge steel frame buildings. A passive method of flood protection is defined as one that does not require human intervention to prevent interior flooding of a building during an unexpected flood event—one that prevents intrusion of rising water into an exterior building envelope. Such method and materials should be applicable to retrofit existing residences, small commercial buildings and other types of structures that are built on concrete slabs and that utilize wood structural framing or light-gauge steel framing in exterior walls. In addition, such method and materials should be applicable to various veneer wall finish materials, i.e. masonry, stucco, and wood or composite siding materials or to new construction.

BRIEF SUMMARY OF THE INVENTION

Method and materials are provided for sealing the exterior of a building built on a concrete slab to a selected height above the slab. Window frames are sealed and special construction of windows extending below the selected height is provided. Door frames are sealed and special construction of doors extending below the selected height is provided. Doors open outwardly from the building Walls are sealed by waterproof panels that are sealed to the slab.

BRIEF DESCRIPTION OF THE SEVERAL VIEWS OF THE DRAWINGS

FIG. 9 is a perspective cut-away view of a stucco wall substrate made flood proof according to one embodiment of method and materials disclosed herein.

FIG. 10 is a perspective view of a newly constructed wood framed wall with new cementitious wet-board wall surface installed and exposed, prior to future masonry veneer installation, made flood proof according to one embodiment of method and materials disclosed herein.

DETAILED DESCRIPTION OF THE INVENTION

Figure 1:
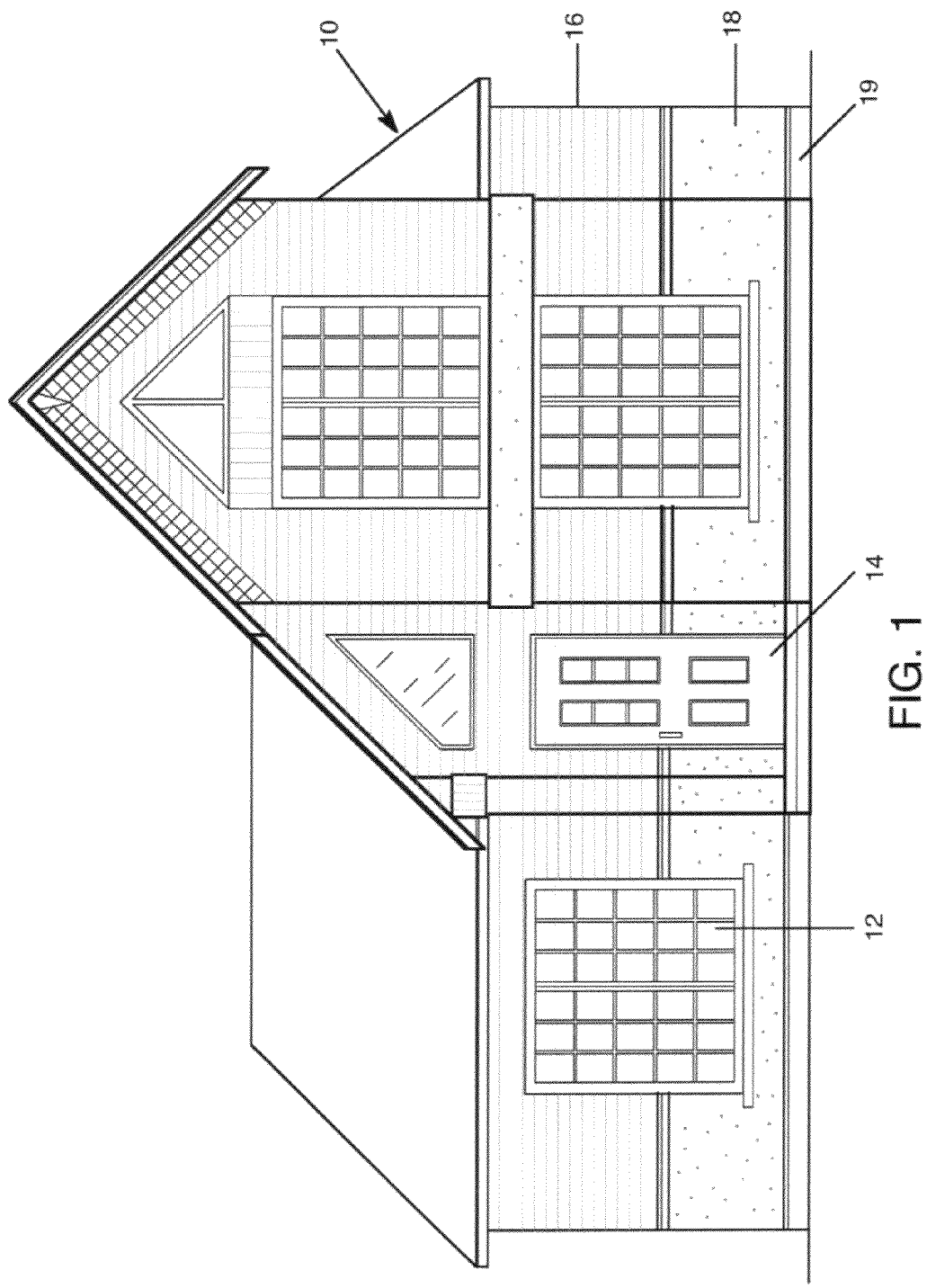
FIG. 1 is a typical front elevation view of a house having a masonry veneer substrate that has been flood protected using method and materials disclosed herein.

FIG. 1 shows the typical front elevation of a house with masonry veneer substrate protected from flood waters by the method and materials disclosed herein. House 10 has windows 12, door 14, exterior masonry veneer substrate 16, which may also be stone, siding, or stucco, for example, and concrete slab 19. Methods and materials disclosed herein allow the windows 12, door 14 and exterior veneer finish 16 of house 10 to be made impervious to rising water to a selected height H, above concrete slab 19 by installing flood proof sections of windows 12 and flood doors 14 to the height H and by forming flood proof wainscot 18 exterior to veneer 16 to height H. A system for flood proofing a structure such as a house must include flood proofing the exterior veneer 16 and all openings in the structure to height H. A residential structure is illustrated in FIG. 1, but the structure may also be a warehouse, office structure, shopping center, church, or any other structure built on a concrete slab.

The height H of the wall surface to be flood-protected is preferably selected according to anticipated flood conditions that may be experienced and the load-bearing capacity of the frame of the building. The height to be flood protected will usually not be greater than 3 feet above the concrete slab 19 on wood frame and light-gauge steel frame buildings, because of the limited strength of the structural frame. Strength enhancement options for increased flood height requirements may be installed, allowing an increase in height H.

The order of application of the materials disclosed here may vary; the method and materials will be described here beginning with the installation of replacement flood windows in an existing structure. New construction methods will also be described in FIG. 10 to the extent that they diverge from procedures for retrofitting an existing structure.

Figure 2:
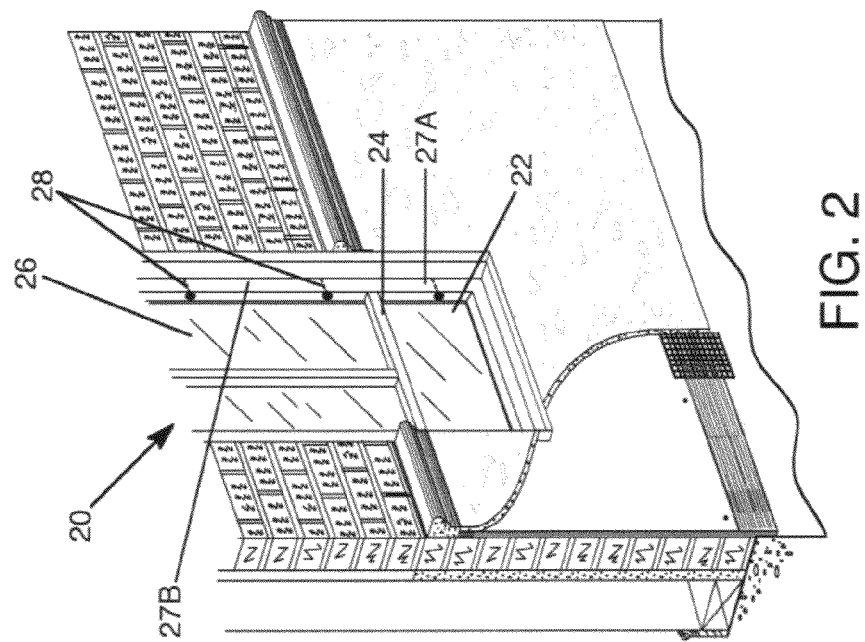
FIG. 2 is a perspective view of a wall and window, with a cut-away view of the wall over a masonry veneer substrate.

Referring to FIG. 2, replacement window assembly 20 is shown, which is a custom flood window unit having glazing 22, which is preferably laminated high impact-resistant safety glazing, with hydro-sealing of the glazing into the vinyl frame segment 27a, as will be described in more detail below. Frame segment 27b may be a conventional frame structure with standard residential glazing features. Replacement window assembly 20 is installed after an existing window has been removed from the rough opening. Glazing 22 extends from the bottom sill of window 20 to height H. Horizontal mullion 24 divides glazing 22 from conventional window structure 26. Frame 27 a and b may be formed from fusion-welded vinyl material, which is standard in the residential window industry.

Figure 3:
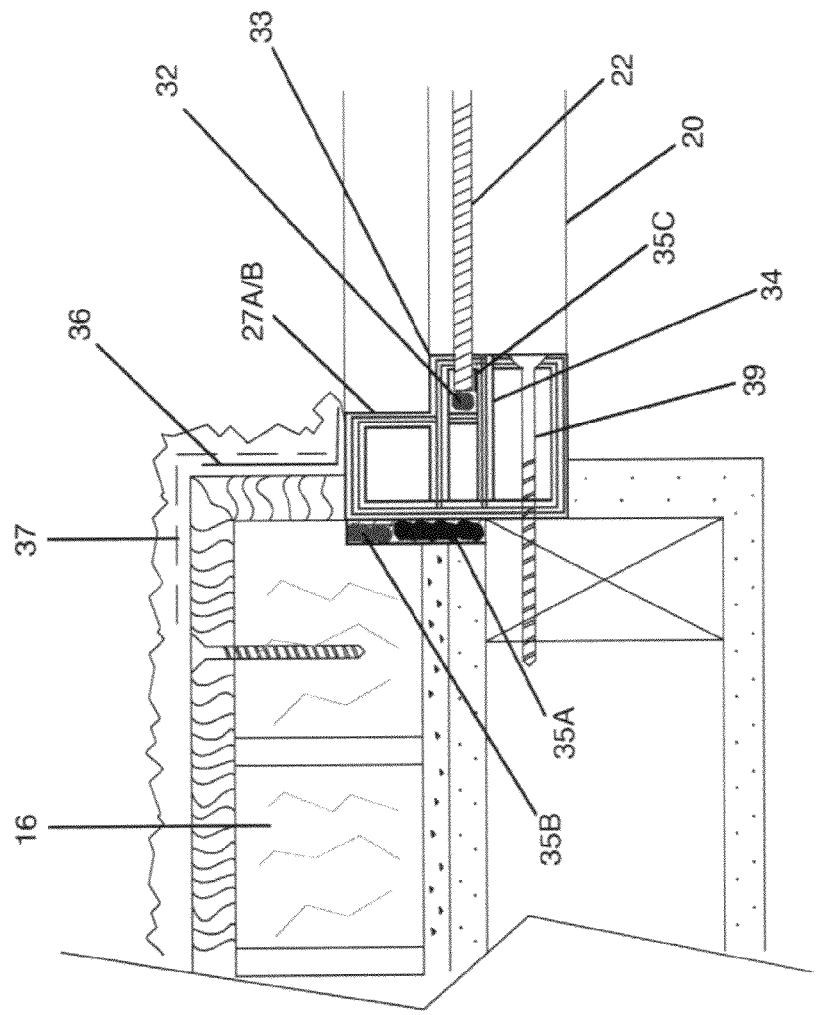
FIG. 3 is a detailed cross-section view of a window and frame disclosed herein.

FIG. 3 shows a horizontal detailed cross-section view of a window and frame assembly and of the hydro-sealing structure for glazing 22. The frame may be fastened into the existing rough window opening with 3-inch side-mounted coated wood screws 39. The perimeter of replacement window assembly 20 is caulked, preferably with 100% silicone glass block caulking 35a between rough framing members and vinyl frame segment 27a and b, and then surface caulked with an elastomeric acrylic waterproof caulk and sealant 35b, such as PERMAPATCH, available from Nationwide Coating Mfrs., Inc. of Sarasota, Fla. (herein "Nationwide"). To provide further sealing, a 2-inch adhesive flashing strip 36, such as Grace Vycor flashing, Quick Roof Flashing, available from Cofair Products, Inc., or equal, is heat applied and overlaid by a continuous filament, spun-laced fabric membrane 37, such as PERMATAPE, available from Nationwide. Fabric membrane 37 is saturated and sealed with an elastomeric waterproofing adhesive bonding primer, such as ACRYLOPRIME sealer (available from Nationwide), overlapping the outer edge of the vinyl window frame and the adjacent wall substrate surface, preferably a minimum of ½ inch on the window frame and 1 inch on the adjacent wall substrate. The above process should be repeated for all window elements extending below height H until the window retrofit procedure has been completed.

Window frame segment 34 is an extruded portion of the frame assembly, designated the "glazing backstop," against which glazing 22 is sealed and compressed when pressure is applied from the window exterior. Double-stick glazing silicone base tape 35c is applied continuously to backstop 34 to prevent movement of the glazing once it is attached to frame 27a. Premium glazing silicone sealant 32 is applied to backstop 34 to further seal the glazing into place and to prevent water leakage. Exterior glazing trim 33 may be clipped into place and sealed with silicone sealant 32. Special care is taken so as not to soil glazing 22 with silicone sealant.

Figure 4:
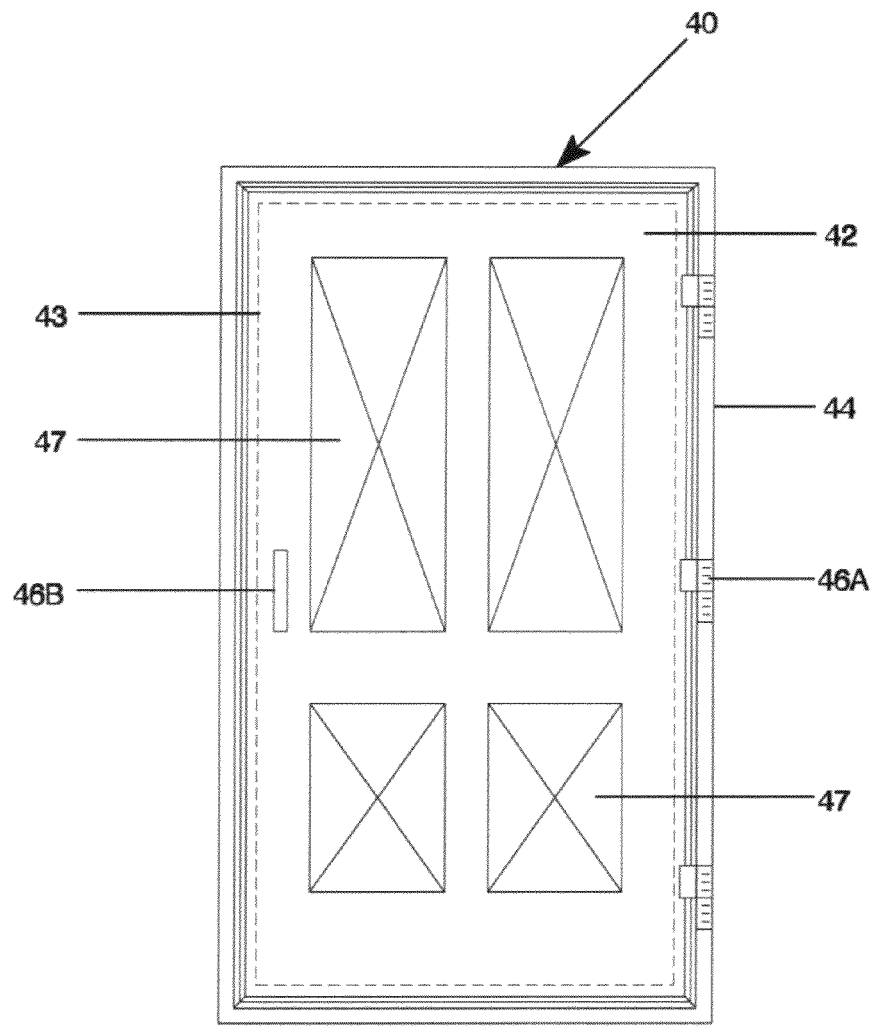
FIG. 4 is an elevation view of the exterior door disclosed herein.

FIG. 4 illustrates replacement door assembly 40, which may be a new or existing retrofitted door installed after an existing door and door jamb have been removed from the rough opening of a structure. Door 42 is preferably supported in door jamb frame 49 by three (3) ball-bearing surface mounted hinges 46a. All steel surfaces are primed and painted with rust preventative products. Door 42 may contain raised panels 47 top and bottom or bottom raised-panels. Door 42 may be insulated metal clad construction, insulated fiberglass clad construction, or solid wood construction with urethane applied as a surface coating (to wood doors only). In all cases, the lower door panel extending to height H, is watertight and preferably has strength to resist impact from a floating object. The door is hinged to open outwardly. Standard new or existing door lockset device 46B may be utilized as a door locking mechanism.

Referring to FIGS. 5A and 5B, door flange frame 43, which may be about 1½-inches wide, extends around the perimeter of the door and is mounted flush with the exterior surface of door 42 with the flange facing the interior. Door 42 is mounted into door flange frame 43 using premium polyurethane construction adhesive between the frame and door surface edge and 2-inch coated wood screws 45 at 16-inch intervals. A continuous twin strand of ⅜-inch by ⅜-inch rubber weatherseal gasket 48 (FIG. 5B), Thermal Blend, Inc. or equal, is glued with premium polyurethane construction adhesive to the interior side of door flange frame 43 so that the gasket compresses against the exterior surface of door jamb frame 44 (a part of door jam frame 49 in FIG. 5A) when door 42 is in the closed position. A single or more strand of weatherseal gasket may also be glued to the interior surface of door flange frame 43, as shown in FIG. 5B. FIG. 5A shows a lower cross-section view of door assembly 40 when the door is in the closed position. Door assembly 40 is fastened to existing house structure 50. FIG. 5B shows an enlarged cross-section view of door 42 with enhanced details of the gasket 48 features. Surface 49 of door jamb frame 44 may be an existing surface of door jamb frame 44 or may be provided by a metal or other material glued to door jamb frame 44. Door assembly 40 is set into the rough-opening frame 50, plumbed and leveled utilizing wood shims if necessary, and anchored into place using 3-inch coated wood screws 51(A) side mounted into door jamb frame 49 and existing wood frame 50. FIG. 5C shows a detail of the hinged side of door 42, with gasket 48 applied to this side also and inside flange 43. As shown in phantom in FIG. 5B, trim molding 52 may be fixed to door flange frame 43 and trim molding 57 and 58 may be placed over fabric member 55.

The void between door jamb frame 49 and the existing opening framing members can be sealed with silicone sealant. All exterior surface perimeter joints around the door jamb frame 49 should be sealed with an elastomeric acrylic waterproof caulk and sealant compound 53 such as PERMAPATCH. To provide further sealing, a minimum 2-inch adhesive flashing strip 54, such as Grace Vycor flashing, Quick Roof Flashing by Cofair Products, Inc., or equal, is preferably heat applied and overlaid by a continuous filament, spun-laced fabric membrane 55, such as PERMATAPE, available from Nationwide. Fabric membrane 55 is thoroughly saturated and sealed with an elastomeric waterproofing adhesive bonding primer, such as ACRYLOPRIME sealer, overlapping the outer edge of the door jamb frame 49 and the adjacent wall substrate surface, preferably a minimum of 1-inch on the door frame and 1-inch on the adjacent wall substrate. The concrete slab area where the existing door sill was removed should be thoroughly cleaned and silicone sealant should be applied immediately before installing replacement door assembly 40. The door sill is firmly set onto previously applied silcone sealant. The front edge of door jamb frame 49 at the sill-to concrete slab joint should be sealed to concrete slab 19 with silicone glass block caulking, taking care not to overlap any elastomeric acrylic caulk and sealant with the silicone. The above installation process should be repeated for all exterior door elements extending below height H until the door retrofit procedure has been completed.

Figure 5:
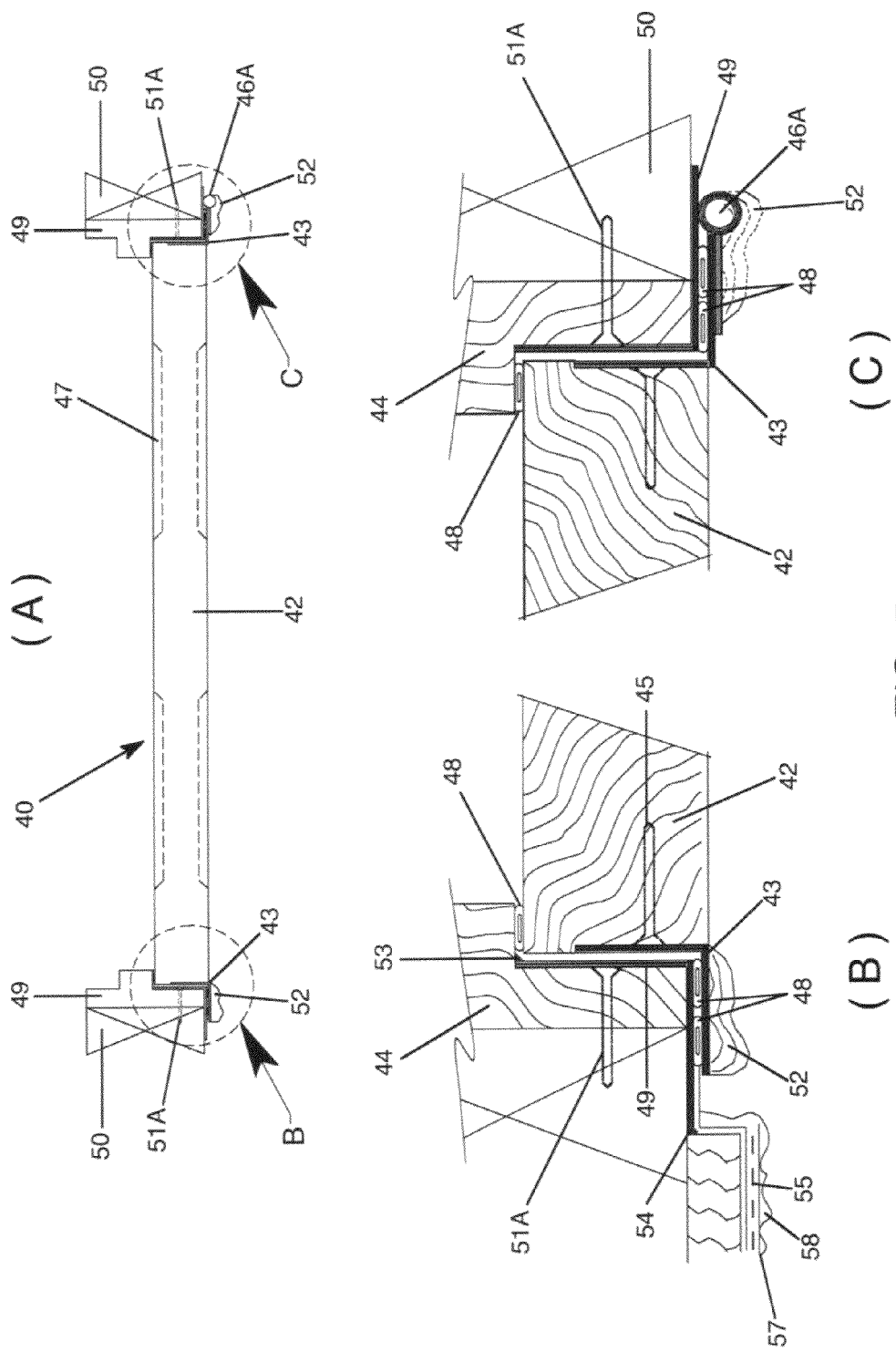
FIG. 5A is a lower cross-section view of the exterior door and frame disclosed. FIB. 5B is an enlarged cross-section view of the exterior door showing gasket seals.
FIG. 5C is an enlarged cross-section view of area C in FIG. 5A.
Figure 6:
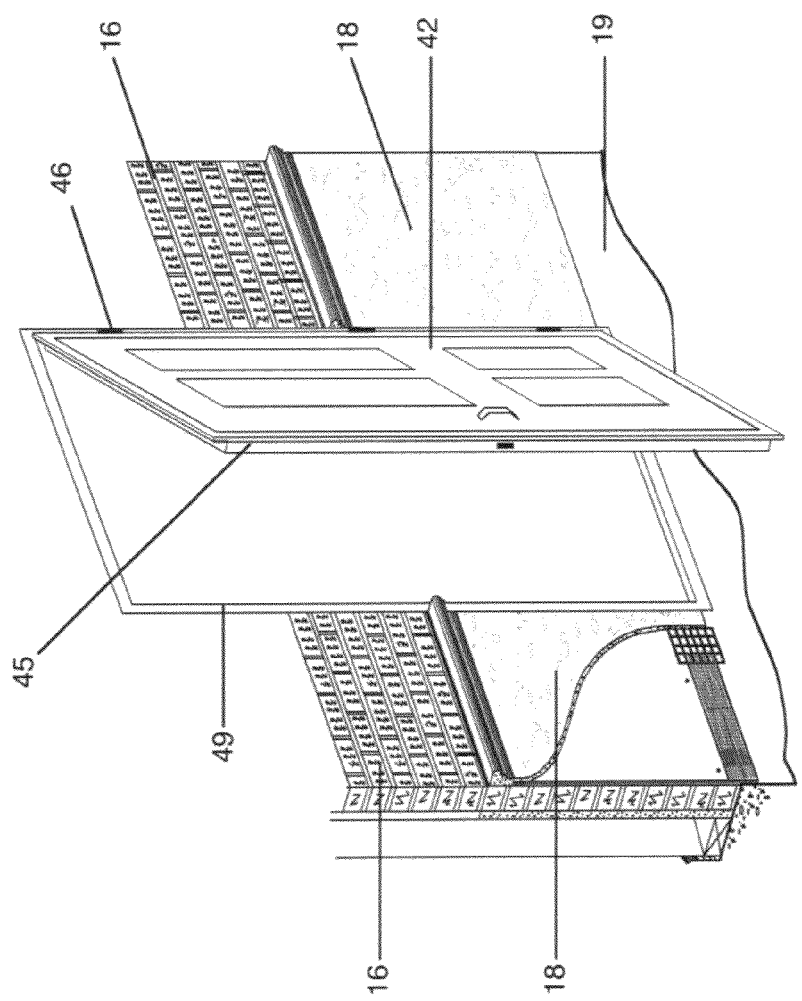
FIG. 6 is a perspective view of a masonry veneer substrate wall with flood proofing wainscot and an exterior door.

FIG. 6 illustrates the position of a rubber weatherseal gasket 45 (which may be same as gasket 48 shown in FIG. 5) located on the interior surface of door flange frame 43, thus providing for compression against the surface face of door jamb frame 49 when the door is in the closed position. The illustration shows masonry veneer substrate with flood proof wainscot 18 applied thereon.

Figure 7:
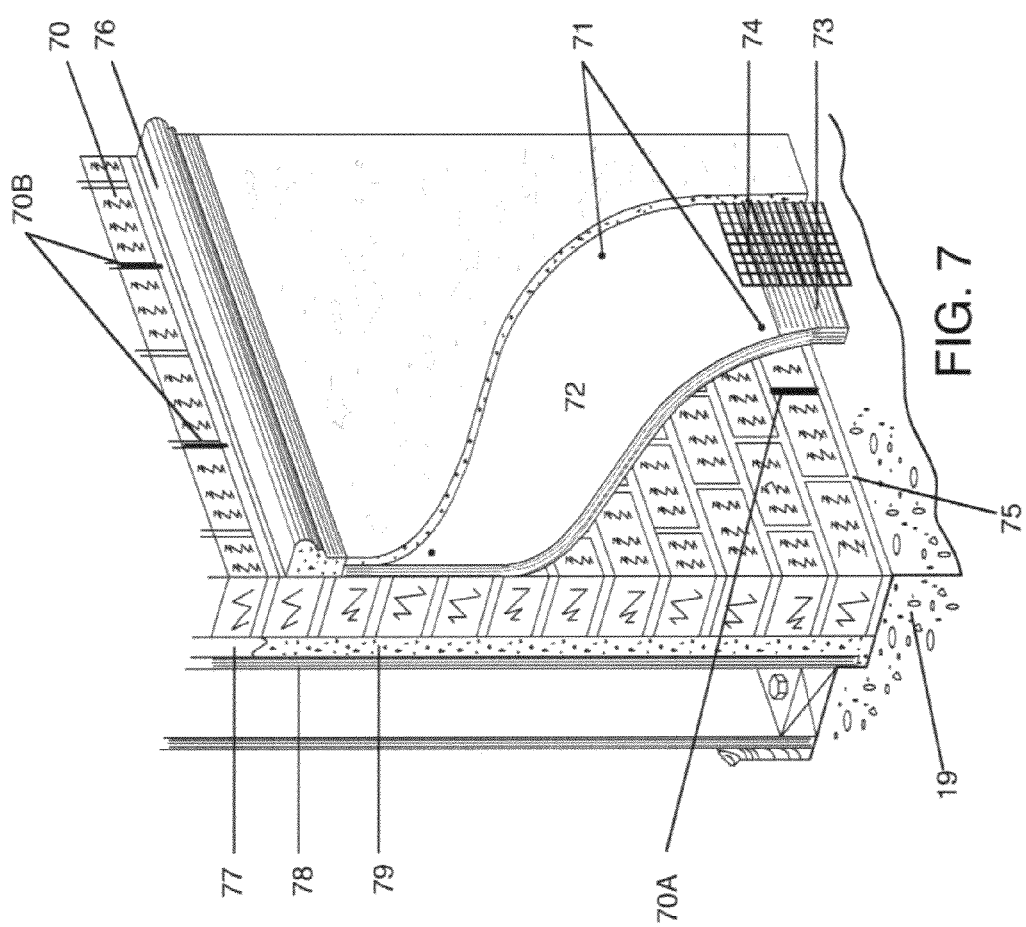
FIG. 7 is a perspective cut-away view of a masonry veneer wall substrate made flood proof according to one embodiment of method and materials disclosed herein.

Referring to FIG. 7, method and material for flood proofing masonry (brick) veneer substrate 70 is shown. In preparation for flood proofing a building having a concrete slab and any veneer substrate material on the exterior walls, the following steps are taken: if less than 6 inches of concrete slab surface area is exposed above existing grade, excavate as required to expose several inches, preferably about 6 inches, of concrete. Then power-wash the exposed slab and preferably the wall surface areas to be flood-protected, using normal procedures.

Other steps to be taken before flood proofing a building using any of the methods and materials disclosed herein are to: relocate exterior electrical receptacles and other electrical apparatus which may be located within the established flood zone wall surface area defined by height H, temporarily remove other exterior wall surface mounted devices for reconnection after exterior wall coatings have been applied, and seal all remaining wall penetrations, preferably with an elastomeric acrylic waterproof caulk and sealant such as PERMAPATCH.

Before beginning flood proofing of masonry veneer substrate 70, it is preferable to saw-cut all protruding masonry window sills and raised accent appointments flush with the wall substrate surface within the flood zone area to insure a smooth and level finished surface area.

An exterior masonry veneer substrate typically possesses a 1-inch air-space 77 between the backside of the masonry substrate 70 and the wall board underlayment 78 attached to the wood frame structure. This air space must be filled solid with mold-resistant material 79, which may be a slurry admixture of sodium silicate and cement grout, up to height H prior to the application of the flood protective materials. All existing masonry weep holes 70a located at the base of the existing masonry substrate should be filled to within 1-inch of the outer surface with 100% silicone caulking sealant. The balance of the opening will preferably be smoothed over with masonry grout to match the existing mortar material and allowed to dry prior to pumping cement admixture 79 into air-space cavity 77 through new weep holes 70b drilled into the existing mortar joints and located above height H. This procedure seals off potentially trapped moisture from the inner wall cavity and allows air and moisture to circulate within the remaining portion of unsealed air-space to prevent mold growth.

Moisture- and mold-resistant cementitious wall board 72, which may be ¼-inch or ½-inch HARDIBOARD Wet Area Cement Board, may be installed over the entire wall surface area to be flood-protected, including an area extending 3 inches below the intersection of wall substrate 70 and concrete slab 19, referred to as base joint 75. Board 72 is then preferably attached to slab 19 using 2-inch masonry anchors 71. A 6-inch continuous strip of Adhesive Flashing 73, which may be Grace Vycor flashing, Quick Roof Flashing by Cofair Products, Inc., or equal, is applied to slab 19 and board 72, preferably in a 50/50 percentage of coverage of each above and below base joint 75. A strip of PERMATAPE 74, saturated and sealed with ACRYLOPRIME, should be the applied, overlapping the top and bottom of the flashing.

All masonry door and window jamb and sill returns should be wrapped with wall board 72, fitting board 72 flush with door jamb frame 49 and window sills/jambs, as shown in FIG. 5 and FIG. 2, and then the perimeter joint should be caulked with an elastomeric acrylic waterproof caulk and sealant 35b and 54, such as PERMAPATCH. Decorative styrofoam stucco molding 76 may be installed across the top edge of cementitious wall board 72 as a transition piece between old and flood-proofed substrates. Prior to the installation of flood protective coatings, all masonry anchor screws 71 should be sealed with PERMAPATCH.

Figure 8:
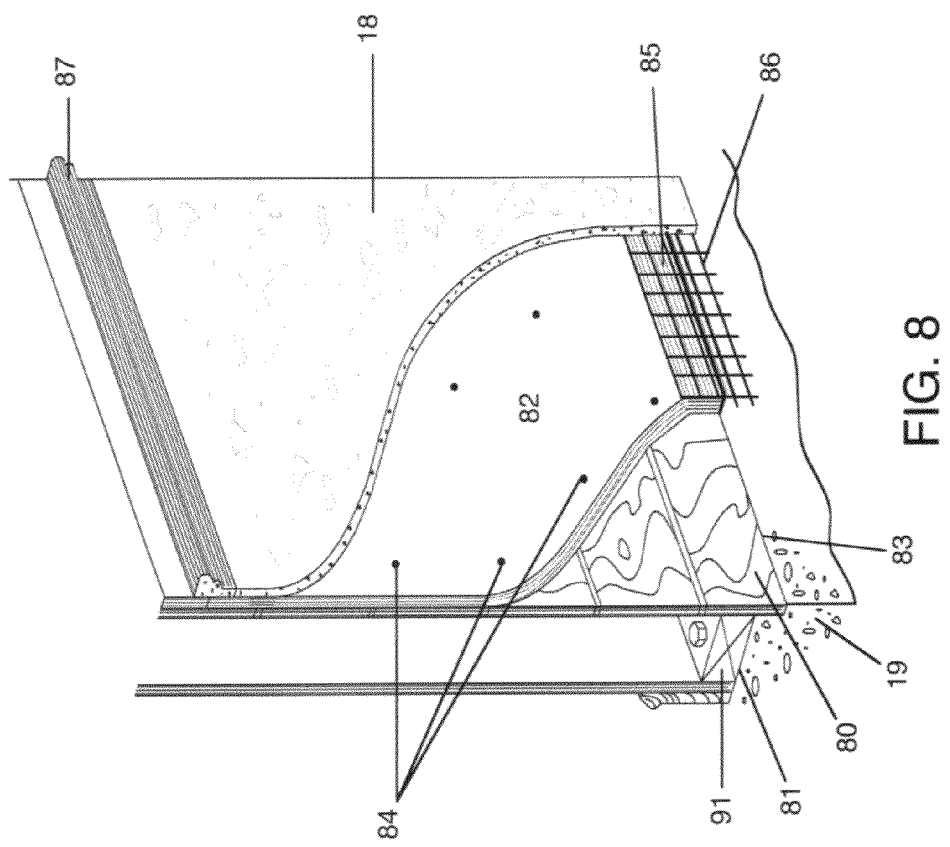
FIG. 8 is a perspective cut-away view of a horizontal siding wall substrate made flood proof according to one embodiment of method and materials disclosed herein.

A coat of elastomeric waterproofing bonding primer such as ACRYLOPRIME sealer should preferably be applied evenly over cementitious wall board 72. Then a decorative waterproof acrylic sand/knock-down/swirl texture coating may be applied (by trowel or spray), such as ACRYLOSAND or ACRYLOSTUK (available from Nationwide), in a selected pattern and texture. Then a single coat of elastomeric adhesive waterproofing and bonding primer sealer, such as PERMABOND should be applied. Finally, two coats of elastomeric acrylic ceramic polyurea finish-coat topping, such as PERMAKOTE SUPER PLUS, color-matched as selected, should be applied. Normally, a minimum 12-hour curing time is allowed before all chemical coating applications Referring to FIG. 8, concrete slab 19 of a building has existing structural framing 91 supporting horizontal siding substrate 80. The same procedure and materials may be used for flood proofing as described above.

A 6-inch continuous strip of adhesive flashing 85 is applied evenly to slab 19 and board 82 intersection, over base joint 83. Base-joint flashing is then sealed with a strip of membrane 86 saturated and sealed with sealer, overlapped top and bottom. Other coating and sealers may be applied as described above. Decorative molding 87 may be added. If a building has concrete exterior siding, it may be flood proofed by caulking, sealing, and coating of the existing substrate without the installation of the cement board underlayment and decorative textured coating finish disclosed above.

Referring to FIG. 9, concrete slab 19 of a building has existing structural framing 91 supporting existing stucco substrate 92. A strip of adhesive flashing 94 is applied evenly to slab 19 and existing stucco substrate 92 as described above. Flashing 94 is covered with PERMATAPE 95 saturated and sealed with sealer overlapped top and bottom as described above. Molding 96 may be added as a decorative transition piece between existing textured stucco substrate 18 (above) and newly applied base-joint materials 95 (below). If not existing, styrofoam stucco molding 97 may be added as a transition agent at the top edge at height H. A coat of elastomeric waterproofing bonding primer may be applied, followed by two coats of elastomeric acrylic ceramic polyurea finish-coat topping, as described above.

Referring to FIG. 10, concrete slab 19 of a new residence under construction has new structural framing exposed with no wall veneer materials yet installed. One-half inch or 1-inch cementitious wall board 101 may be attached directly to new wood framing members 100 with 2-inch coated wood screws 102. It is preferable that the building design assures placement of all windows above height H and therefore flood windows will not be required. Should new flood windows be required for the building design, steps illustrated in FIG. 2 and FIG. 3 for windows and installation procedures should be followed. In addition, steps illustrated in FIG. 4 for the installation of new flood doors should be followed.

For base joint 103 flood protection, the following application is preferred: a 6-inch continuous strip of adhesive flashing 104 is applied evenly to slab 19 and cement wall board substrate 101 over new framing 100, preferably in a 50/50 percentage of coverage of each above and below base joint 103. Flashing 104 is then sealed with a strip of membrane 105 saturated and sealed with sealer overlapped top and bottom, as described above. Horizontal brick ledge 106 may exist in lieu of a vertical concrete slab 19 surface, in which case the above procedure may encompass horizontal brick ledge 106 in addition to the vertical slab surface as part of the flood protection procedure. Masonry elements will be installed on top of flood protected horizontal brick ledge 106.

All wall board substrate 101 joints are sealed with a strip of membrane 105 saturated and sealed with sealer. A coat of elastomeric waterproofing bonding primer, followed by two coats of elastomeric acrylic ceramic polyurea finish-coat topping, such as PERMAKOTE SUPER PLUS (available from Nationwide), should be applied, as described above.

In all installations using the method and materials disclosed herein, plumbing modifications are preferred. A 4-inch back-flow prevention device with before/aft clean-out capability should be installed in the main sanitary sewer line between the house structure and the street. An individual anti-siphon back-flow prevention device should be installed on each exterior hose bib located within the flood zone. Also, all thru-wall penetrations for gas and plumbing should be sealed with PERMAPATCH caulk and sealant material prior to coating application procedures and silicone caulking after completion of industrial coatings application.

EXAMPLES

A model building was constructed according to the methods and materials described herein and tested under real-flood test conditions as follows:

Prototype I.

A concrete slab-on-grade residential foundation was constructed, 8 ft×8 ft in dimension, with an exposed foundation 12 inches above the existing grade. Thereafter, a wood-frame structure was constructed thereon using standard 2×4 stud framing at 16-inch on center, with a single base-plate attached to the concrete foundation with standard anchor bolts at 4 ft on center, standard metal cross-bracing strips, a single 2×4 plate as a header at the top of the 4 ft wall height, and exterior foil-faced particle board sheathing applied to the exterior face of the stud wall—all materials typically used in a wood framed residential structure.

Wall finishes typical to residential construction and additional special features were included in the prototype for testing as follows:
  Standard masonry face-brick veneer was applied to the exterior surface of one wall with a 1-inch air space between the brick and the exterior wall sheathing and typical masonry ties and weep holes included in the masonry installation.
  Metal lath with a 1-inch stucco finish was applied as the surface material on one wall.
  Standard siding materials, HARDIPLANK in 4 ft×8 ft solid sheets cut to size appropriate to the wall conditions were installed on two separate walls.
  One standard 3-ft wide door opening was provided for the testing of various door samples.
  One standard 4-ft wide window opening was provided for the testing of various window samples.
  A continuous 3-ft wide by 3-ft high waterproof moat was constructed around the perimeter of the residential prototype with the floor level of the moat 4 inches below the finish floor level of the concrete foundation of the prototype in order to accommodate foundation/wall base joint flood protection requirements.

Flood protection methodologies were implemented and tested as follows:
  The installation of one layer of Fiber Reinforced Polymer (FRP) applied to the exterior wall surfaces of the prototype was tested initially and although 100% successful under real-flood test conditions to a flood height 3 ft above the foundation level, the process was deemed too labor intensive, too climate restrictive in the installation process, and too expensive due to the requirement of extensive architectural finishing of the flood protected area. The complete protection of wall-to-window and wall-to-door joints also proved insufficient to prevent 100% leakage due to the potential of minor shrinkage of the FRP product during curing. Environmental-related issues also created some concern due to the required use of epoxy products in the procedure.
  Once the above flood protective application procedures were completed, the enclosed moat surrounding the prototype was flooded to a height of 3 ft and sustained at that level for a 24-hour duration. There was zero leakage in the protective wall finishes; however, various methodology adjustments were required to prevent leakage around the door and window. Various door and window components were installed within the prescribed prototype openings. Surprisingly, in subsequent tests a 100% leak-free structure was achieved using the methods and materials disclosed herein.

The installation of the multi-stage protective coating system disclosed here proved to be an excellent remedy as a durable, environment friendly, easily applied, exterior watt surface protective finish. The architectural finish is accomplished within the water proof coating system itself, thus eliminating the need for a separate surface finish process. The use of linen mesh in sealing the foundation to wall base joint and the door and window units into place in conjunction with the appropriate coating materials provided a 100% leak-free solution.

Prototype II.

An existing free-standing concrete stab-on-grade garage structure with a ½-inch×8-inch horizontal lap-and-gap HARDIPLANK siding exterior was utilized as the second prototype for real-flood simulations. As with Prototype I, a 3-ft× 3-ft continuous moat was constructed across an 8-ft section of the rear wall of the existing building with the floor level of the moat constructed 4 inches below the finished concrete floor level of the existing garage. There was an existing troublesome base joint condition to contend with; the concrete slab having a 2-inch bow in it due to poor concrete forming when the building was originally constructed. This condition served to enhance our testing of flood protection at the base joint utilizing the multi-stage coating system, and it provided a critical real-life condition that could reasonably be encountered in field conditions.

The existing siding material was tested in two ways:
  (1) The existing horizontal HARDIPLANK siding, the foundation/wall base joint, and all other joints and wall penetrations were sealed and coated utilizing the system disclosed herein without the installation of the wet board underlayment product and the subsequent application of a stucco wainscot architectural finish. This test proved that existing HARDIPLANK siding can be flood-protected without the additional cost of the architectural stucco wainscot application. This represents a considerable cost savings for buildings with existing HARDIPLANK siding on the exterior walls.
  (2) The existing horizontal HARDIPLANK siding was covered with ½-inch wet board underlayment and then covered with the multistage coating system and textured with a stucco finish utilizing the system disclosed herein, including the installation of decorative molding at the header of the new stucco wainscot.
  Both of the above applications were flooded to a height of 3 ft for a 24-hour time period without any leakage into the interior garage space. In addition, flood conditions to a height of 12 inches above the slab level were maintained for several months without flooding at the critical base joint or through the walls.

In addition to the above test, an existing 3 ft×6 ft–8 inches pedestrian door providing entry into the garage area was retro-fitted according to the disclosure and tested independently by constructing a 4 ft×3 ft×3 ft moat across the front of the retro-fitted door assembly after the completed installation. The door assembly was tested for a 24-hour period without leakage. This test proved that an existing door can be properly modified and retro-fitted for use in the disclosed flood protection system in addition to the use of a new flood door assembly.

It should be noted that several independent tests of door and window assemblies were repeatedly tested utilizing the same procedures, each test documenting points of weakness and/or failure, until the disclosed door and window systems were found to be waterproof.

Although the present invention has been described with respect to specific details, it is not intended that such details should be regarded as limitations on the scope of the invention, except to the extent that they are included in the accompanying claims.

I claim:

1. A flood proof door assembly for preventing damage by flood water intrusion into an interior of a building, comprising:
    a door having an exterior surface and two vertical side surfaces;
    a door flange frame consisting of an L-shape having a first portion secured to one of the vertical side surfaces of the door, and a second portion extending parallel to and outwardly of the exterior surface of the door;
    a door jamb frame member consisting of an L-shape having a first portion adapted to be secured to the L-shaped door flange frame and to a door jamb frame, and a second portion;
    a plurality of hinges pivotably attaching the door flange frame to the second portion of the door jamb frame member; and
    a first sealing gasket mounted on an interior surface of the second portion of the door flange frame, wherein the first sealing gasket is in contact with an exterior surface of the second portion of door jamb frame member when the door is installed and in a closed position.

* * * * *